United States Patent [19]

Gregg

[11] Patent Number: 5,017,414
[45] Date of Patent: May 21, 1991

[54] METHOD FOR MANUFACTURING A SECOND SURFACE OPTICAL STORAGE DEVICE

[75] Inventor: David P. Gregg, Culver City, Calif.

[73] Assignee: Del Mar Avionics, Irvine, Calif.

[21] Appl. No.: 296,782

[22] Filed: Jan. 17, 1989

[51] Int. Cl.$^5$ .............................................. B32B 3/02
[52] U.S. Cl. ....................................... 428/64; 428/65;
428/913; 346/76 L; 346/135.1; 264/104;
264/106; 369/275.1; 369/288
[58] Field of Search ............. 369/275, 288; 346/76 L,
346/135.1; 428/64, 65, 913; 264/104, 106

[56] References Cited

U.S. PATENT DOCUMENTS 4,314,262 2/1982 Reilly ................................. 369/275
4,818,852 4/1989 Haddock et al. .................... 235/488

FOREIGN PATENT DOCUMENTS 0251794 1/1988 European Pat. Off. .

Primary Examiner—Patrick Ryan
Attorney, Agent, or Firm—W. Douglas English

[57] ABSTRACT

A method for large scale and economical manufacture of a second surface optical recording disk is disclosed. An optically transparent disk cover with tracking grooves and data etched on a mating side thereof is mated and embossed into an optically reactive layer of a first surface optical recording laminate web or sheet having an optically active layer, a reflective layer and a web support layer. The second surface optical recording device thereby created is then cut from the laminate web to yield a very inexpensive second surface optical recording disk.

19 Claims, 3 Drawing Sheets

METHOD FOR MANUFACTURING A SECOND SURFACE OPTICAL STORAGE DEVICE

BACKGROUND OF THE INVENTION

1. FIELD OF THE INVENTION

This invention relates to an optical storage disk, card or device and in particular a method for the manufacture thereof.

2. DESCRIPTION OF THE PRIOR ART

Existing optical disk or card art relating to write once-read many (WORM), magneto-optical (erasable) type or similar optical recording devices generally consists of a laminated or multilayered structure having a rigid support substrate, a reflective layer, a photosensitive optically reactive second surface layer which is, depending upon disk or card application, covered by a first surface optically transparent protective coating layer. Historically each said layer has been subsequently superimposed intermittently upon the preceding layer on a disk by disk basis, by various succeeding methods such as injection or compression molding, spin coating, sputtering, vacuum deposition, and, in general, by means of individual layer by layer lamination techniques. Each substrate is processed to receive succeeding such lamination coatings individually, serially or in batches of small numbers. More recent trends in optical recording technology have led to development of first surface optically recordable laminations which have been conveniently and efficiently manufactured in a continuous, rather than intermittent, process in wide webs of great length and width in a manner analogous to conventional manufacture of magnetic tape. By such means, optical recording laminations may likewise be manufactured in an efficient and economical process. However, although such first surface optically recording laminations may be cut into circular or rectangular sheets as well as traditional lengthy tapes, the relatively thin, first surface optically recordable disks or cards produced in such manner have significant disadvantages when compared to earlier second surface optical recording structures.

In spite of a thin protective coating over the first surface optically reactive layer of such laminated sheets, randomly attracted dust particles of but a micron or so in diameter, not visible to the unaided eye, may lodge very close to the first surface optically reactive layer, thereby blocking out significant areas of the optically reactive layer causing commensurate dropouts of data recorded and reproduced with subsequent loss of information.

In addition, the relatively thin laminate sheet structure of optical disks cut from an optical laminate sheet has no rigid structural component and therefore has a tendency to bend and curl. Therefore, it is necessary that such laminate optical recording disks be spun immediately above a flat stationary surface at a speed above a critical minimum which flattens the disk to optical record/reproduce requirements by formation of an air bearing film, generally referred to as the Bernoulli approach.

There exists therefore a longstanding and continuing need for a new and improved optical recording disk having the rigid, second surface optical attributes of a thick and transparent substrate and therefore a surface which will hold dust and mechanical defects at a safe distance from the plane of a focussed record/reproduce beam on the recordable layer, yet also having the economical manufacturing advantages of a first surface optical lamination of large sheets of an optical recording medium. The invention disclosed herein does just that by combining the technical advantages of a second surface optical medium together with the manufacturing simplicity and efficiency of a first surface optical recording medium.

SUMMARY OF THE INVENTION

The invention disclosed herein provides a new and novel method of fabricating an optical recording disk by combining attributes of two existing optical disk types and by such means further yields a new and novel optical recording medium as well. The invention conceives applying an optically transparent cover, conventionally molded in disk shape or other desired shape, with or without preset data or tracking grooves as desired, to a conventionally manufactured first surface optical recording lamination conventionally having a pliant web support base, a reflective layer, and an optically reactive layer; however, not having a conventionally thin and pliant protective layer. Said cover is then compressed into a first surface optical recordable lamination to bond and seal permanently the two components and thereby yield a second surface optical recording medium. The newly formed second surface optical recording structure is then cut from the lamination sheet to yield a second surface optical recording lamination that is, in essence, manufactured in a two-step process as opposed to the conventional multistep process of manufacturing second surface optical recording disk by starting with a disk substrate and then successively adding each desired layer, i.e. reflective layer and protective layer.

OBJECT OF THE INVENTION

It is therefore a primary object of the invention to provide an improved efficient and cost-saving method of manufacturing a second surface optical recording medium by combining and utilizing portions of two distinct and independent existing methods of manufacturing first surface optical recording lamination tapes with second surface optical recording disks. It is a further object of the invention to provide a new and novel optical recording medium produced by such novel manufacturing process. These and other objectives, features, benefits, and advantages of the disclosed invention will become more readily apparent upon reading the following detailed description of the preferred embodiment in view of the accompanying drawing and appended claims.

DETAILED DESCRIPTION OF A PREFERRED EMBODIMENT

Figure 1:
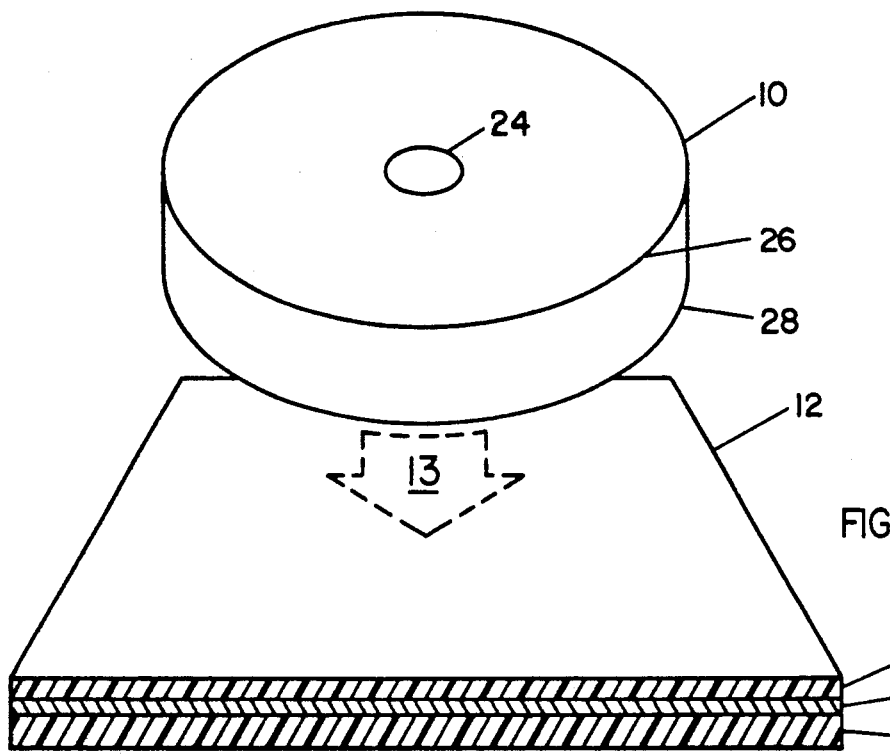
FIG. 1 illustrates a disk-shaped optically transparent cover being impressed upon a first surface optically recordable laminate sheet.

The invention method for manufacturing a second surface recordable medium is in large part illustrated in FIG. 1., wherein a relatively thick disk-shaped optically transparent cover 10 is illustrated by arrow 13 as being impressed and/or embossed upon a first surface optically recordable laminate sheet 12 of indefinite length and width and relatively invariant depth. Although laminate sheet 12, less a protective layer, is a commercially available item, it may be independently manufactured.

A web substrate 18 of laminate sheet 12 consists of a commercially available film-forming material such as polyethylene terephthalate (PET) in the preferred embodiment but may likewise be other material of high elastic modulus. In the embodiment disclosed herein, web substrate 18 of great optical smoothness conventionally serves as a pliant support structure for superimposition thereon of succeeding laminate layers, and also serves as a nonrecordable side of an optically recordable laminate web, tape, or sheet, and, dependent upon thickness thereof, provides a degree of protection as well. Web substrate 18 may normally be 25 um in thickness, and of indefinite length and width, as is necessary to accommodate production of a large number of second surface optically recordable disks, cards or other desired format. A reflective layer 20 of approximately 100 nm in thickness is aluminum in the preferred embodiment but may also be gold, silver, or copper alloy, and is conventionally vacuum deposited upon base layer 18. A photoreactive layer 20 is then applied to reflective layer 22 to complete the processing of optical recording laminate sheet 12. Optically reactive layer 22 is generally in the realm of 100 nm in thickness, is a soluble dye polymer or dye-binder polymer blend, and is conventionally applied by spin coating, spraying, rolling or dipping. The dye in reactive layer 22 is a cyanine stable polymethine having photospectrometric absorbence peaks at or near the wavelength of a record/reproduce laser or beam of radiation. Specific thickness of optically reactive layer 22 must be determined as a function of the laser (radiation) wavelength, 780 nm in the preferred embodiment, the refractive indices of the dye polymer in reactive layer 22, and reflective characteristics of reflective layer 20, as is well understood by practitioners in the art.

Figure 2:
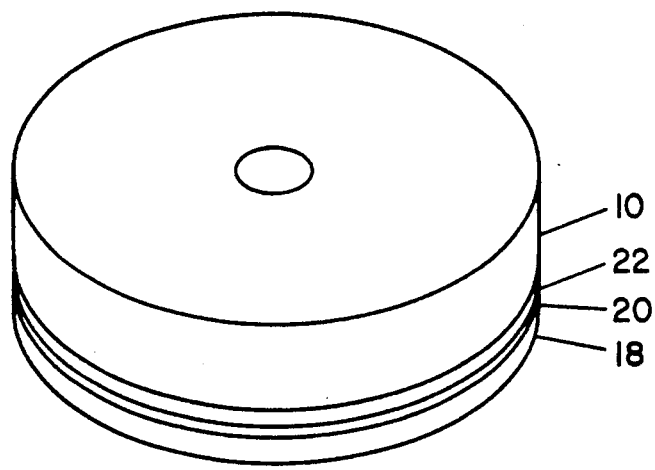
FIG. 2 illustrates a second surface optically recordable disk obtained by FIG. 1 process.
Figure 3:
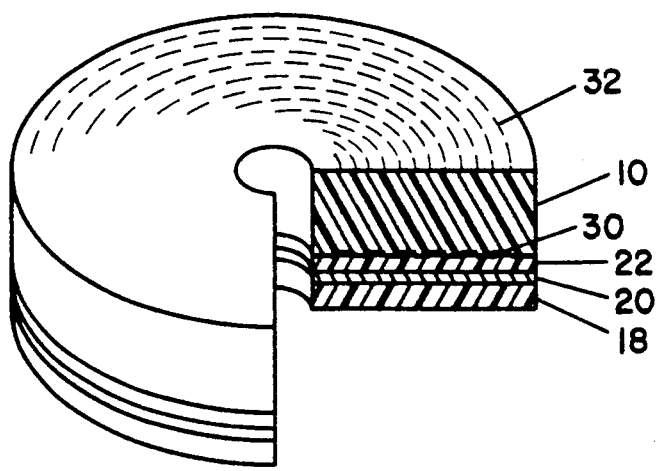
FIG. 3 illustrates a cutaway view of FIG. 2.
Figure 4:
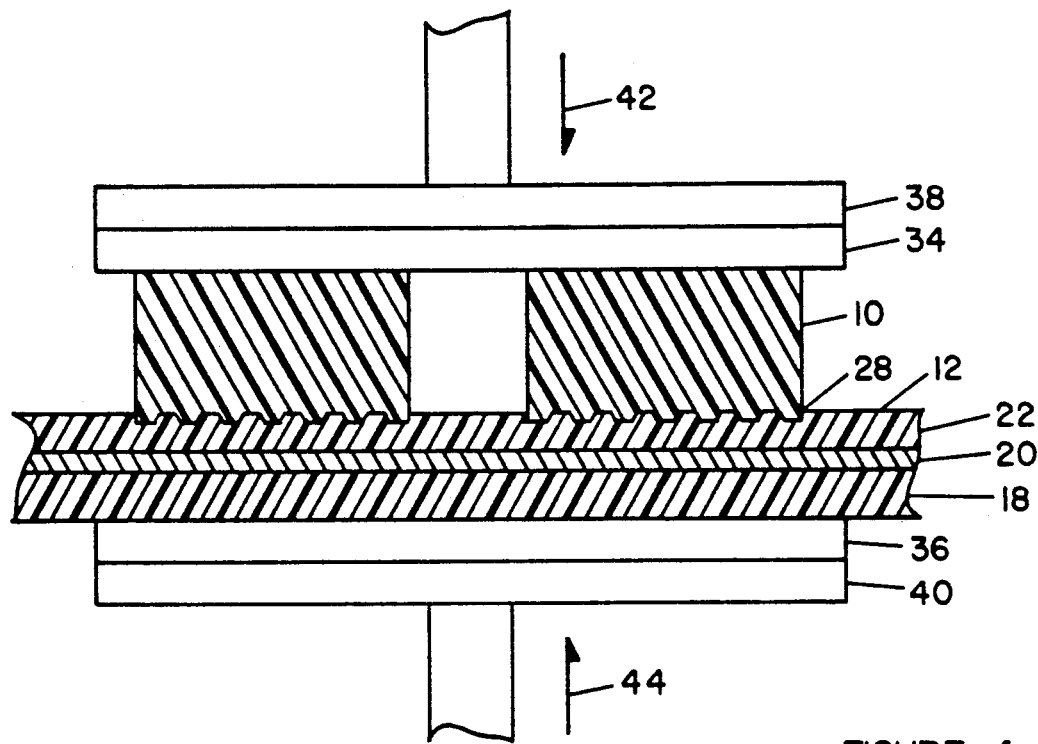
FIG. 4 illustrates the compression-embossing process of cover and laminate sheet.

Once first surface optically recordable laminate sheet 12 is so manufactured or provided, it is then converted into second surface optically recordable disk or card by forced application thereto of optically transparent cover 10. Cover 10 is generally a disk-shaped polycarbonate structure and in the realm of 120 to 300 mm in diameter for industrial, commercial, government and entertainment data recording applications; however, it should be understood that size of the disk is determined solely on need and application. Cover 10 is circular in the preferred embodiment, but may, of course, be of any geometrical design as needed for particular applications. Cover 10 is provided with a spindle hole 24 in the center thereof and has a planar exposed side 26 and a grooved mating side 28. Grooved side 28 is provided with a spiral laser tracking groove 30 or in the preferred embodiment as illustrated in cutaway view of FIG. 3. Grooved side 28, may, however, be formatted or provided with concentric circular tracking grooves and may further be provided with encoding information and data corresponding to sectors, addresses, and beginning/ending codes. Dashed lines 32 indicate hidden spiral or concentric tracking grooves on mating side 28 of cover 10. Alternatively, second side 28 may be provided with no tracking or coding impressions. Grooved mating side 28 of cover 10 is forcefully applied and embossed into first surface optically recordable layer 22 of laminate sheet 12 as illustrated in FIG. 4, with sufficient pressure to insure a sealed and permanently embossed and bonded composite. A pressure of approximately two atmospheres ($2 \times 10^5$ pascal or $nt/m^2$) is sufficient. Upon proper setting and curing of the seal between cover 10 and laminate structure 12 (approximately 1 minute) the cover/laminate structure is now a second surface optically recordable structure and is circularly sheared from laminate sheet 12 as a separate structure illustrated in FIG. 2. FIG. 2 illustrates the finished product: a second surface optically recordable disk comprising a first surface optically transparent cover 10, a second surface optically recordable/reactive layer 22, a reflective layer 20 and a web substrate layer 18.

A cross section of the cover-laminate embossing process is illustrated in FIG. 4. As illustrated in FIG. 4 the grooved mating side 28 of cover 10 is mated with and embossed into the optically active layer 22 of laminate sheet 12. Uniform pressure distribution is necessary and provided to eliminate all pockets or anomalies between the two surfaces. Elastomeric pads 34 and 36 mounted on pressure plates 38 and 40, respectively, provide the necessary flexible distribution of pressure indicated by arrows 42 and 44. Throughout the embossing process, a degree of vacuum in the realm of a torr ($1.3 \times 10^{-3}$ atmospheres) is necessary such that no atmosphere or gas may be entrapped between the faying surfaces of cover 10 and laminate sheet 12. Plasticity of the dye polymer in reactive layer 22 permits conformance with the grooved surface 28 of cover 10, thereby completely eliminating all voids in the faying surfaces. It is conceived that many such covers 10 may be embossed at the same time on a single-laminate sheet 12 and likewise many such embossed disks may be simultaneously sheared from laminate sheet 12 in a mass production process.

Figure 5:
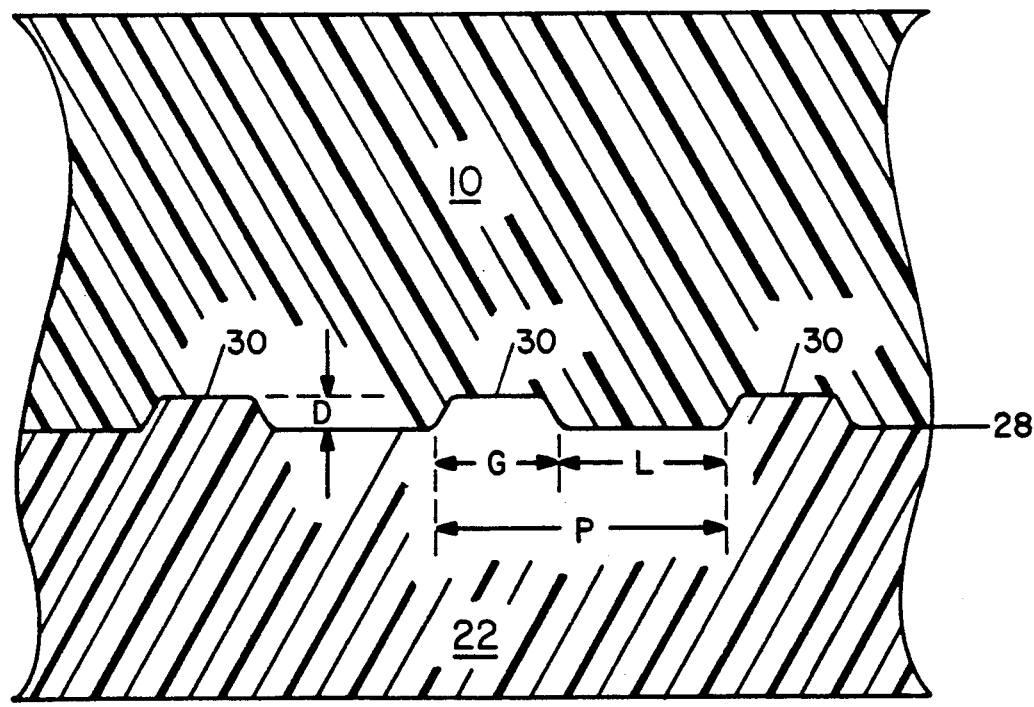
FIG. 5 illustrates the unique preferred embodiment tracking groove requirements.
Figure 6:
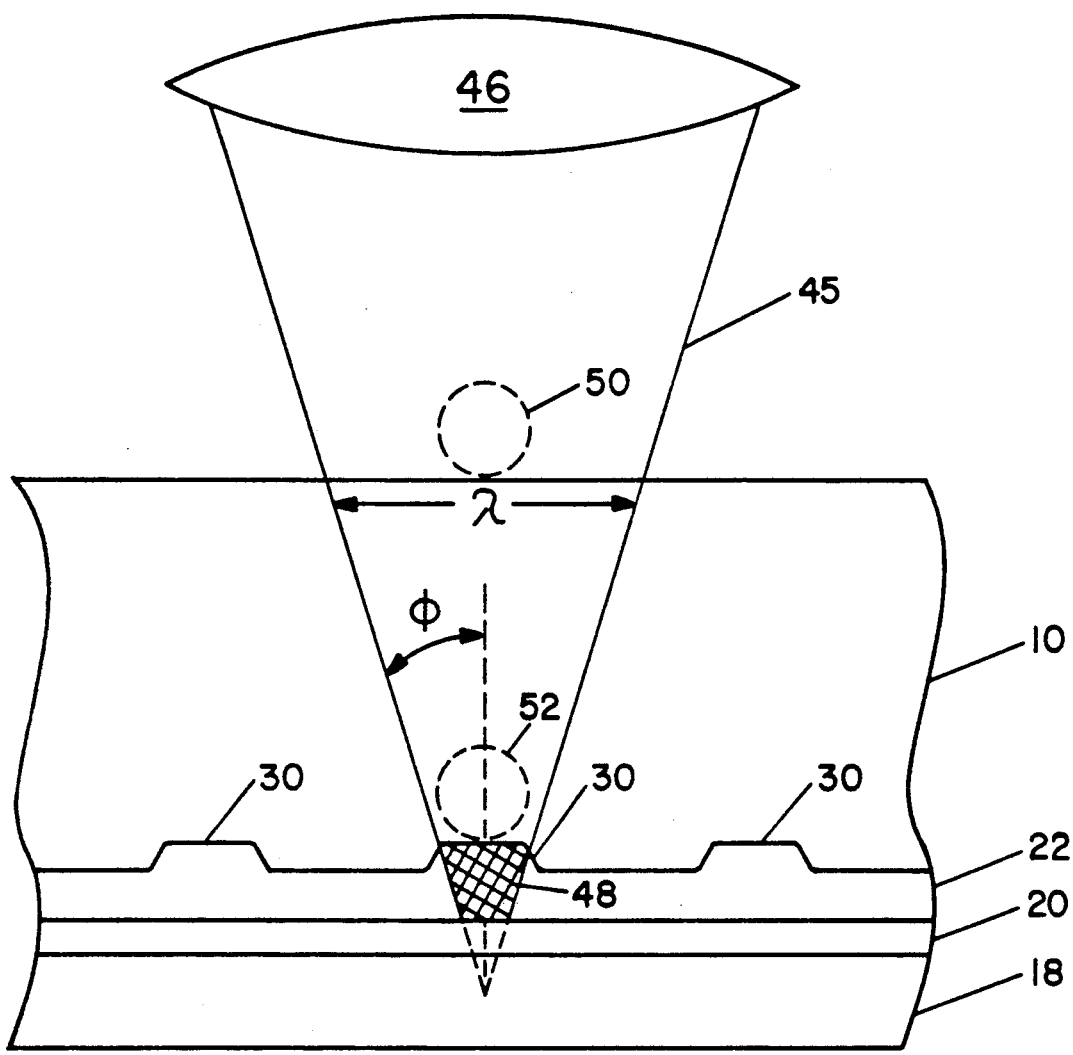
FIG. 6 illustrates the recording and reading characteristics of a disk made by the invention process.

Referring now to FIG. 5, a blown-up section of a portion of the embossing surfaces of FIG. 4 is provided. In the preferred embodiment grooves (G) of cover 10 when meshed with optically active laminate layer 22 must have a width of 0.4 to 0.6 um and a depth (D) of 0.1 um. The land (L) between grooves (G) must be 1.0 um yielding a pitch (P) of 1.4–1.6 um. Referring now to FIG. 6, a view is illustrated of the recording/reading (writing/reproducing) process of the second surface optically recordable medium thusly constructed. Typically a laser beam 45 of wavelength lambda ($\lambda$) is focused by an objective lens 46 onto a grooved track 30 of the second surface optically recordable disk described in FIG. 3. Beam 45 passes through optically transparent layer 10 and through optically reactive layer 22 where the energy of the beam 45 initiates a chemical reaction with the dye polymer therein. Beam 45 passes through optically reactive layer 22 to reflective layer 20 where it is reflected passing back through optically reactive layer 22 thereby enhancing the activity of optically reactive elements therein, to yield an occluded area 48 that can later be read and interpreted as data.

Of even greater import is the ability of the second surface recordable disk to "see through" a typical dust particle 50. If a similar dust particle 52 were to be on the optically active surface 22, it could sufficiently block transmission of the laser beam to prevent either write or read modes.

Although a particular embodiment of the invention has been illustrated and described, it is understood that obvious modifications and alterations of components thereto within the ambit of the disclosure and claims is anticipated. It is intended therefore that the following claims be interpreted to cover all such modifications which fall within the spirit and scope of the invention.

I claim:

1. An optical recording structure, comprising:
    a support layer;
    an optically reflective layer superimposed upon said support layer;
    an optically reactive recordable layer superimposed upon said reflective layer; and
    a formattable optically transmissive cover layer superimposed upon said reactive layer.

2. A recording structure according to claim 1, wherein said base consists of a polymer, such as polyethylene terephthalate.

3. A recording structure according to claim 1, wherein said optically reflective layer consists of a metallic material.

4. A recording structure according to claim 1, wherein said optically reflective layer consists of dye polymer.

5. A recording structure according to claim 1, wherein said formattable, optically transparent cover consists of a thermoplastic molded polymer such as polycarbonate.

6. A recording structure according to claim 5, wherein said optically transparent cover is formatted with a spiral tracking groove.

7. A recording structure according to claim 5, wherein said optically transparent cover is formatted with concentric tracking grooves.

8. A recording structure according to claim 5, wherein said optically transparent cover is formatted with sectors, addresses, and beginning/ending encoding.

9. A process for manufacture of a second surface optical disc, comprising the steps of:
    forming by conventional means a first surface optically recordable laminated tape having a web base support layer, a reflective layer deposited on said web base, and an optically reactive first surface layer superimposed upon said reflective layer;
    forming by conventional molding means a transparent polymer disc having spiral tracking grooves and limited data embossed upon a mating surface of said polymer disc;
    compressing and thereby embossing and bonding said mating surface of said disc with said optically reactive first surface layer of said tape to form a preformatted second surface optically reactive structure; and
    die cutting said second surface optically reactive structure into a number of preformatted, second surface optical discs.

10. In an optical recording laminate web having at least one first surface optical recording layer with a capability of forming regions of variable reflected radiation to a focused radiation beam, the combination with an optically transparent cover layer superimposed on said optical recording layer thereby converting said first surface optical recording laminate tape into a second surface optical recording structure.

11. A process for manufacturing a second surface optically recordable disc formatted with tracking grooves and limited data, comprising the steps of:
    positioning in a planar orientation a sheet of optically recordable lamination having a reflective lamination and a first surface optically recordable lamination;
    placing a formatted surface embossed with tracking grooves and limited data of an optically transparent disc on said first surface of said optically recordable lamination;
    compressing said first surface of said optically recordable lamination with said formatted surface of said optically transparent disc to create a permanent and sealed bond thereof, thereby creating a formatted second surface optically recordable disc upon which additional data may be written; and
    die cutting said second surface optically recordable disc from said sheet of optically recordable lamination.

12. A process according to claim 11, wherein said sheet of optically recordable lamination comprises:
    at least one base support layer;
    an optically reflective layer superimposed upon said support layer; and
    an optically reactive recordable layer superimposed upon said reflective layer.

13. A process according to claim 12, wherein said base consists of a polymer, such as polyethylene terephthalate.

14. A process according to claim 12, wherein said optically reflective layer consists of a metallic material.

15. A process according to claim 12, wherein said optically reactive layer consists of a dye polymer.

16. A process according to claim 11, wherein said formattable, optically transparent cover consists of a thermoplastic molded polymer.

17. A process according to claim 16, wherein said optically transparent cover is formatted with a spiral tracking groove.

18. A process according to claim 16, wherein said optically transparent cover is formatted with concentric tracking grooves.

19. A process according to claim 16, wherein said optically transparent cover is formatted with data corresponding to sectors, addresses and beginning/ending encoding.

* * * * *